A. Van Riper,
Fruit Basket,
N° 5247.  Patented Aug. 21, 1847.

UNITED STATES PATENT OFFICE.

ABRAHAM VAN RIPER, OF WASHINGTON TOWNSHIP, BERGEN COUNTY, NEW JERSEY.

IMPROVEMENT IN BASKETS.

Specification forming part of Letters Patent No. 5,247, dated August 21, 1847.

*To all whom it may concern:*

Be it known that I, ABRAHAM VAN RIPER, of Washington township, county of Bergen, and State of New Jersey, have invented an Improved Basket for Peaches, Apples, Corn, &c.; and I hereby declare the following is a full and exact description of the same, reference being had to the annexed drawings, which make a part of this specification.

The object of my improvement is to prevent the bottom of fruit-baskets from sinking or falling down. This I effect by introducing two hoops of about one-fourth inch thickness—the one on the bottom of the inside of the basket and the other on the bottom of the outside of it. These hoops are connected by rivets or nails, and thereby securing between them the standards of the basket. By this contrivance the bottom of the basket, which is arched or coved, cannot yield by an inside pressure, as the hoops (on the principal of the abutment of an arch) prevent the standards from pressing outward.

Figure 1:
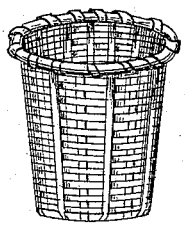
Figure 2:
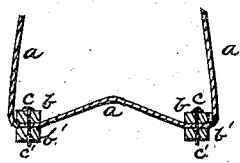

Figure 1 is a view of the basket. Fig. 2 is a section.

$a\ a\ a$ is one of the standards. $b\ b$ is the inside hoop, and $b'\ b'$ is the outside hoop. $c\ c'\ c\ c'$ are the rivets or nails which fasten the two hoops and the standards together.

What I claim as my invention, and desire to secure by Letters Patent, is—

The application of two hoops, fastened together by nails or rivets, so as to inclose the standards which form the arched bottom of the basket and prevent them from yielding or falling down by the pressure of fruit, &c., which the basket may contain.

ABRAM. VAN RIPER.

Witnesses:
EDWD. JONES,
JAMES STOVAL, Jr.